(No Model.)
S. P. HUTCHINSON.
GUIDING DEVICE FOR CULTIVATORS, &c.
No. 320,473. Patented June 23, 1885.
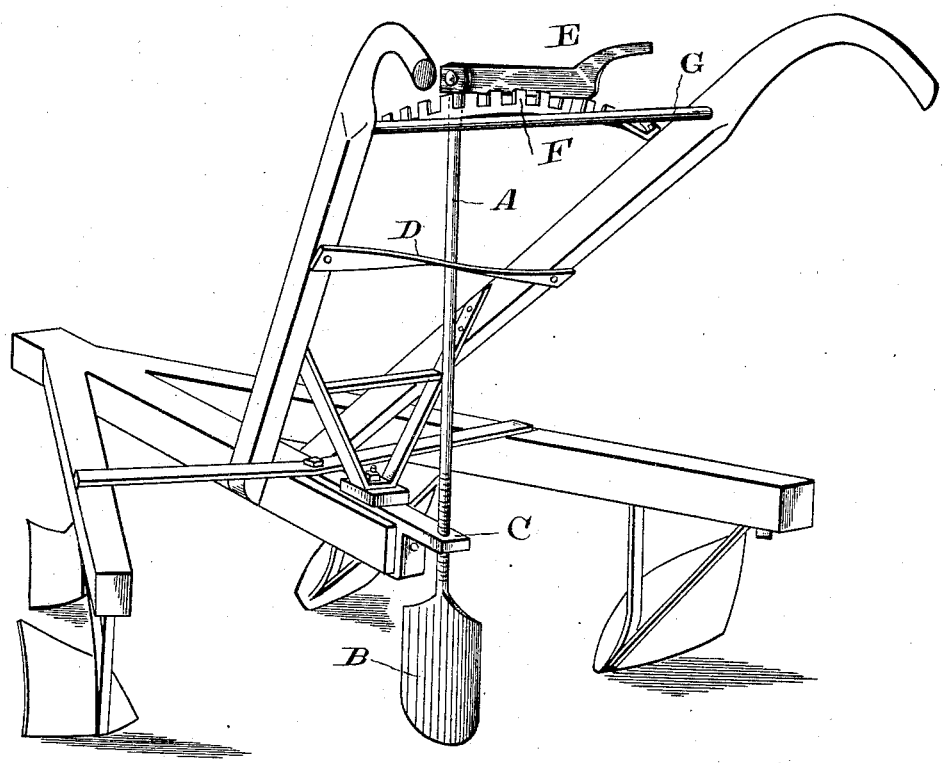
WITNESSES
Wilmer Bradford
Marshall B. Woodworth
INVENTOR
Seaborn P. Hutchinson
By C. W. M. Smith,
Attorney

United States Patent Office.

SEABORN P. HUTCHINSON, OF SARATOGA, CALIFORNIA.

GUIDING DEVICE FOR CULTIVATORS, &c.

SPECIFICATION forming part of Letters Patent No. 320,473, dated June 23, 1885.

Application filed January 10, 1885. (No model.)

*To all whom it may concern:*

Be it known that I, SEABORN P. HUTCHINSON, a citizen of the United States, residing at Saratoga, in the county of Santa Clara and State of California, have invented a new and useful Guiding Device for Cultivators, Plows, Harrows, &c., of which the following is a specification.

The object of my invention is to provide a means whereby the heel or rear portion of a cultivator, plow, harrow, &c., is prevented from sliding down or deviating from the line of draft when engaged upon side hills or inclines of fields, and also to direct the heel of the implement to or from the "land," as desired. I accomplish these objects by the means illustrated in the accompanying drawing, which represents a view in perspective of my improved cultivator-guide.

A represents a vertical spindle, which is provided at the lower end thereof with a two-edged shovel-shaped blade, B.

Just above the shovel-blade a screw-thread is cut upon the spindle, which operates in a nut upon the end of a split brace, C, which latter is bolted to the end of the middle beam of the cultivator. By this means the shovel-blade can be raised or lowered, so as to graduate the depth of the blade as it enters the earth.

The spindle B also passes up through a guiding and supporting arm or bar, D, which is connected to the plow or cultivator handles, as shown, and to the upper end of the spindle is connected a pawl or arm, E, which engages with the teeth of a curved rack, F, which latter is connected to the cultivator-handles in front of the round G, so that by operating the pawl-arm the shovel-blade can be set at different angles or raised and lowered at will, or otherwise be made to act as a rudder to the implement and direct the heel of the implement to which it is attached to or from the rows or hills of vines, cereals, &c., in cultivating the soil.

By this means it will readily be seen that the plowman is greatly relieved from the constant watching of the implement to prevent it from sliding downward in cultivating hillsides, and, by turning the blade, throw the heel or rear end of the implement to or from the hills or rows that are being cultivated, whether upon hillsides or level ground.

Having thus described my invention, what I claim, and desire to secure by Letters Patent, is—

In a plow or cultivator, the combination of the adjustable blade or rudder-plate B, having a vertical spindle, A, the supports C D, rack-bar F, and pawl E, substantially as shown and described.

In testimony that I claim the foregoing I have hereunto set my hand and seal.

SEABORN P. HUTCHINSON. [L. S.]

Witnesses:
C. W. M. SMITH,
JAMES L. KING.